US006917708B2

(12) United States Patent
Goodman et al.

(10) Patent No.: US 6,917,708 B2
(45) Date of Patent: Jul. 12, 2005

(54) HANDWRITING RECOGNITION BY WORD SEPARATION INTO SILHOUETTE BAR CODES AND OTHER FEATURE EXTRACTION

(75) Inventors: Rodney M. Goodman, Altadena, CA (US); Donal J. Woods, Los Angeles, CA (US); Patricia A. Keaton, Woodland Hills, CA (US); Joseph Chen, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 56 days.

(21) Appl. No.: 09/765,772

(22) Filed: Jan. 19, 2001

(65) Prior Publication Data

US 2001/0033694 A1 Oct. 25, 2001

Related U.S. Application Data

(60) Provisional application No. 60/176,972, filed on Jan. 19, 2000.

(51) Int. Cl.[7] .................................................. G06K 9/72
(52) U.S. Cl. ....................................... 382/186; 382/229
(58) Field of Search ................................ 382/229, 203, 382/186

(56) References Cited

U.S. PATENT DOCUMENTS 4,905,296 A * 2/1990 Nishihara .................... 382/203
5,524,066 A * 6/1996 Kaplan et al. .............. 382/200
5,557,689 A 9/1996 Huttenlocher et al.

OTHER PUBLICATIONS

Bozinovic et al. "Off–Line Cursive Script Word Recognition." IEEE Trans. on Pattern Analysis and Machine Intelligence, vol. 11, No. 1, Jan. 1989, pp. 68–83.*

* cited by examiner

*Primary Examiner*—Jon Chang
(74) *Attorney, Agent, or Firm*—Fish & Richardson P.C.

(57) ABSTRACT

A method of automatically recognizing text. The text is divided into whole words which are each recognize. Each whole word is characterized according to its silhouette. The silhouette is characterized by features in the silhouette such as upwardly extending "polls" and downwardly extending "holes". The silhouette may also be characterized by its first syllable blends. Numbers are assigned to each of the different characteristics, and numbers may also be assigned based on analysis of a database of different kinds of cursive words. Recognition may be automatically carry out prior recognizing system which recognizes in this way.

8 Claims, 14 Drawing Sheets

| PATH # USED IN THE PROTOTYPE STUDY NOTEBOOK | SILHOUETTE | DEFINITION OF PROFILE |
|---|---|---|
| .001 | *a ─────* | CAPITAL "A" WITH NO "POLES" OR "HOLES" (NO PROTRUDING LETTERS LIKE "b, d, h, k, l" ABOVE MIDLINE OR BELOW BASELINE SUCH AS "g, p, y, z, x, ETC.) |
| .002 | *a ─┬─── ─* | CAPITAL "A" WITH ONE "HOLE" (DOWN STROKE) SOMEWHERE IN THE MIDDLE OF THE WORD --AT LEAST ONE LETTER AWAY FROM THE CAPITAL "A" AND NOT AT THE END. |
| .003 | *a ────┐* | CAPITAL "A" WITH ONE "HOLE" (DOWN STROKE) AT THE END. |
| .005 | *a ──┴──* | CAPITAL "A" WITH ONE "POLE" (HIGH STROKE) SOMEWHERE IN THE MIDDLE OF THE WORD --AT LEAST ONE LETTER AWAY FROM THE CAPITAL "A" AND NOT AT THE END OR NEXT TO THE END. |
| .006 | *a ────┴* | CAPITAL "A" WITH ONE "POLE" (HIGH STROKE) LOCATED ONE LETTER AWAY FROM THE END --SUCH AS "-le, -ly, -de, -te, -dy, -by, ETC." |
| .007 | *a ─────┘* | CAPITAL "A" WITH ONE "POLE" (HIGH STROKE) LOCATED AT THE END. |

FIG. 2A

| PATH # USED IN THE PROTOTYPE STUDY NOTEBOOK | SILHOUETTE | DEFINITION OF PROFILE |
|---|---|---|
| .025 | 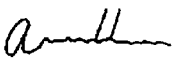 | CAPITAL "A" WITH TWO ADJACENT "POLES" (TWO CONSECUTIVE UP STROKES) SOMEWHERE IN THE MIDDLE OF THE WORD --AT LEAST ONE LETTER AWAY FROM THE CAPITAL "A" AND NOT AT THE END. |
| .043 | 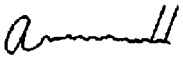 | CAPITAL "A" WITH TWO ADJACENT "POLES" (TWO CONSECUTIVE UP STROKES) AT THE TERMINAL END. |
| .052 |  | CAPITAL "A" WITH "POLE" FUSED WITH A "HOLE" CREATING A CONTINUOUS LINE THAT BREAKS BOTH THE UPPER AND LOWER HORIZON LINES. --- THIS WOULD RECOGNIZE THE PRESENT DAY CURSIVE LETTER "f" AND COULD ALSO FILTER 18TH CENTURY WORDS FOR THE OLD STYLE "S". ∫ |
| .092 |  | TERMINAL "f" OR 18TH CENTURY "S" ("∫") |
| .102 | 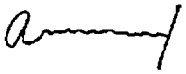 | DOUBLE "f" OR DOUBLE 18TH CENTURY "S" LOCATED IN THE MIDDLE OF THE NAME. |
| .120 |  | DOUBLE TERMINAL "f" OR DOUBLE 18TH CENTURY "S" AT THE END OF THE WORD. |

FIG. 2B

 + 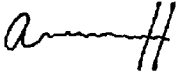 → 
.002           .005           2-5

FIG. 3A

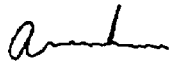 +  → 
.005           .002           5-2

FIG. 3B

| "HIGH PROFILE" LETTERS OR "TALLS" | PRIME # | "LOW PROFILE" LETTERS (GOPHERS) | PRIME # | BOTH HIGH AND LOW PROFILE LETTER | PRIME # | FIRST SYLLABLE BLEND | FILE # | DEFINITION |
|---|---|---|---|---|---|---|---|---|
| | | | | | | A--- | 10. | "A" \| NO HIGH PROFILE IN ADJACENT POSITION |
| b | 1 | | | | | Ab--- | 110. | "Ab"-- ONLY ONE HIGH PROFILE LETTER FOLLOWED BY MEDIAN |
| | | | | | | Abb--- | 111. | "ABB"-- TWO HIGH PROFILE LETTERS ADJACENT TO "A" |
| d | 2 | | | | | Ad--- | 120. | 2ND LETTER "HIGH" 3RD LETTER "MEDIAN" |
| | | | | | | Adb-- | 121. | 2 "HIGHS" (d b) |
| | | | | | | Add-- | 122. | 2 "HIGHS" (d d) |
| | | | | | | Adk-- | 124. | 2 "HIGHS" (d k) |
| | | | | | | Adl-- | 125. | 2 "HIGHS" (d l) |

FIG. 4

CHENANGO COUNTY, NEW YORK

| TOWN | # | PHOTOCOPY OF DOCUMENT (N.Y. TAX ROLLS - 1800) | PATH # (ZIP CODE) | HYBRIDIZATION FACTORS | SILHOUETTE | DIGITIZED NAME |
|---|---|---|---|---|---|---|
| BROOKFIELD | | | | | | |
| | 1 | Amos | 10.001 | - | *Amos* | Amos |
| | 2 | Anderson William | 10.016 | 5.2 | *Anderson* | Anderson |
| | 3 | Anderson William | 10.061 | 5.52 | *Anderson* | Anderson |
| | 4 | Allen | 155.001 | - | *Allen* | Allen |
| | 5 | Abbey Daniel | 111.003 | - | *Abbey* | Abbey |
| CAZENOVIA | | | | | | |
| | 6 | Alger Oliver | 150.002 | - | *Alger* | Alger |
| | 7 | Alger | SAME | | SAME | SAME |
| | 8 | Adams Daniel | 120.001 | - | *Adams* | Adams |
| | 9 | Allen William | 155.001 | - | *Allen* | Allen |
| | 10 | Anderson William | 10.005 | - | *Anderson* | Anderson |
| | 11 | Abby Richard | 111.003 | - | *Abby* | Abby |
| | 12 | Aldridge Dusty | 152.016 | 5.2 | *Aldridge* | Aldridge |
| | 13 | Aditt Henry | 120.043 | - | *Aditt* | Aditt |
| | 14 | Alsworth Jasper | 150.043 | - | *Alsworth* | Alsworth |
| | 15 | Anderson | 10.005 | - | *Anderson* | Anderson |
| | 16 | Aldridge Joseph | 152.016 | 5.2 | *Aldridge* | Aldridge |

*FIG. 5A*

CHENANGO COUNTY, NEW YORK

| TOWN | PHOTOCOPY OF DOCUMENT (N.Y. TAX ROLLS - 1800) | PATH # (ZIP CODE) | HYBRIDIZATION FACTORS | SILHOUETTE | DIGITIZED NAME |
|---|---|---|---|---|---|
| 17 | Arnold Tily | 10.043 | - | *(signature)* | Arnold |
| 18 | Alvord Benjamin | 150.007 | - | *(signature)* | Alvord |
| 19 | Alvord Ira | SAME | - | SAME | SAME |
| 20 | Abell Isber | 110.043 | - | *(signature)* | Abell |
| 21 | Annis Oliver | 10.001 | - | *(signature)* | Annis (Amiss) |
| 22 | Abbot Willard | 111.007 | - | *(signature)* | Abbot (Abbat) |
| 23 | Austin Caleb | 10.005 | - | *(signature)* | Austin |
| 24 | Aber Williams | 110.001 | - | *(signature)* | Aber |
| 25 | Ashard Samuel | 10.023 | 5.7 | *(signature)* | Ashard * |
| 26 | Allverton William | 155.005 | - | *(signature)* | Allverton |

* NAME FOUND IN 1800 N.Y. TAX ROLLS, BUT NOT IN WEST L.A. PHONE BOOK CONSEQUENTLY THIS WOULD NOT HAVE BEEN INCLUDED IN A SPELLCHECK LIST

FIG. 5B

| 10.000 | 10.001 | 10.002 | 10.003 | 10.004 | 10.005 | 10.006 | 10.007 | 10.008 | 10.009 | 10.010 |
|---|---|---|---|---|---|---|---|---|---|---|
| Hybrid #'s | | PRIME | PRIME | 2-3 | PRIME | PRIME | PRIME | 2-2 | 2-5 | 2-5-3 |
| SILHOUETTE | *a* | *a* | *a* | *a* | *a* | *a* | *a* | *a* | *a* | *a* |
| | Aaron | | | | Acken | | | | | | |
| | Aaronson | | | | Acker | Acevedo | Acret | | | | |
| | | | | | Ackerman | | | | | | |
| | | | | | Ackermann | | | | | | |
| | Acaas | | | | Ackerson | | | | | | |
| | Acamon | | | | Acton | Acosta | | | | | |
| | Acres | | | | Ainslie | | | | | | |
| | Aceves | | | | Amber | | Amet | | | | |
| | | | | | Ambers | | Amick | | | | |
| | Ain | | Airey | | Ambrose | | Amound | | | | |
| | Ainis | | | | Ambrosini | | | | | | |
| | Airs | | | | Ambrosio | | | | | | |
| | | | | | Amiani | | | | | | |
| | Ames | Amcaro | Amey | | Amier | | | | | | |
| | Amies | Amcere | Amery | | Amlin | | | | | | |
| | Amiri | | | | Anastasi | | Anisn | | Angelino | |
| | Amirian | Amyas | | | Anderson | | Annand | | Angeus | |
| | Amis | | | | Andersson | | Ansel | | Anglin | |
| | Amiss | | | | Andiman | | | | Angsten | |
| | Ammerman | | | | Andrew | | | | | |

*FIG. 6A*

| 10.000 | 10.001 | 10.002 | 10.003 | 10.004 | 10.005 | 10.006 | 10.007 | 10.008 | 10.009 | 10.010 |
|---|---|---|---|---|---|---|---|---|---|---|
| PATH #'s | | PRIME | PRIME | 2-3 | PRIME | PRIME | PRIME | 2-2 | 2-5 | 2-5-3 |
| SILHOUETTE | *an* | *an* | *an* | *an* | *an* | *an* | *an* | *an* | *an* | *an* |
| | Ammons | | | | Andrews | | | | | |
| | Amos | | | | Andrus | | | | | |
| | Amron | | | | Anker | | | | | |
| | | | | | Ankers | | | | | |
| | Anis | Angres | | | Annakin | | | | | |
| | Anisman | | Anning | | Anselmo | | | | | |
| | Annis | Anguiano | | | Anslie | | | | | |
| | Ansin | | Ansary | | Anstie | | | | | |
| | Anson | | Ansay | | Antin | | | | | |
| | Ansan | | | | Anton | | | | | |
| | Anwar | Angus | | | | | | | | |
| | | Angwin | | | | | | | | |
| | Arenson | Anyan | | | | | | | | |
| | Arias | | Arcay | | Arbisser | | | | | |
| | Aris | | Arney | | Archie | Ariola | Arch | | | |
| | Arison | | Aronowicz | | Archer | Armenta | Armench | | | |
| | Armer | Aragon | | | Arden | Aruda | Armand | | | |
| | Armon | Araiza | | | Ardern | | Armond | | | |
| | Armour | Ariza | | | Ardmore | | | | | |
| | Arnesen | | | | Arduser | | | | Anzalone | |
| | | | | | Arlen | | | | Arguenta → 2.3 | |
| | | | | | Ascher | | Ash | | Arrington | |

FIG. 6B

| 10.000 | 10.001 | 10.002 | 10.003 | 10.004 | 10.005 | 10.006 | 10.007 | 10.008 | 10.009 | 10.010 |
|---|---|---|---|---|---|---|---|---|---|---|
| PATH #'s |  | PRIME | PRIME | 2-3 | PRIME | PRIME | PRIME | 2-2 | 2-5 | 2-5-3 |
| SILHOUETTE | *a—* | *a⊤* | *amy* | *any* *ayT* | *and* | *and* | *and* | *ayTT* | *ayL* | *ayL* |
|  | Aron |  |  |  |  |  |  |  |  |  |
|  | Aronson |  |  |  |  |  |  |  |  |  |
|  | Aronow |  |  |  |  |  |  |  |  |  |
|  | Arrow |  |  |  |  |  |  |  |  |  |
|  |  |  |  |  | Asher |  |  |  |  |  |
|  |  |  |  |  | Ashenan |  |  |  |  |  |
|  |  |  |  |  | Ashman |  |  |  |  |  |
|  |  |  |  |  | Ashmore |  |  |  |  |  |
|  |  |  |  |  | Ashouri |  |  |  |  |  |
|  | Asimov |  |  |  | Askari |  |  |  |  |  |
|  | Asner |  |  |  | Askin |  |  |  |  |  |
|  |  |  |  |  | Askew |  |  |  |  |  |
|  | Auer |  |  |  | Aster |  |  |  |  |  |
|  | Aves |  |  |  | Aston |  | Auch |  |  |  |
|  | Avin |  |  |  | Austen | Avila |  |  |  |  |
| 1/6/99 | Avins |  |  |  | Austin |  | Avenl |  |  |  |
|  |  |  |  |  |  |  |  |  | Augustein |  |
|  |  |  |  |  |  |  |  |  | Augustine |  |

FIG. 6C

HANDWRITING RECOGNITION BY WORD SEPARATION INTO SILHOUETTE BAR CODES AND OTHER FEATURE EXTRACTION

CROSS-REFERENCE TO RELATED APPLICATIONS

This application claims priority from provisional application No. 60/176,972, filed Jan. 19, 2000.

BACKGROUND

Pattern recognition techniques, including neural networks, statistical pattern recognition, and others may rely on a training phase that is based on a list of labeled examples. It has been difficult to provide such training phase to automatically recognize cursive writing. Doing this would require sampling a database of labeled examples of handwritten words. Producing such a list by human effort is hugely time-consuming and may be infeasible.

However, there may be many uses for such information. For over 70 years microfilm has been an efficient media with which to make archival information available to the general public. The Library of Congress began converting archive records to microfilm in 1928. Cursive OCR (Optical Character Recognition) may extend technology at the California Institute of Technology, microfilm access may be extended to offer worldwide Internet access to archive records.

This may allow the following, and other, applications:

1) Economic History—digitized property assessments and tax rolls may give economic historians one of their first looks at the changes in middle class investment profiles throughout world history. The industrial aristocracy may have invested in plantations and shipping lines, but over time, the yeoman middle class family has typically invested in a home. Centuries of these digitized surveys, therefore, could eventually measure middle class expansion and contraction with the fortunes of war, plague, trade, immigration, and technical innovation.

2) Census Records—Over the centuries, a wealth of handwritten census data has been conserved which connects one generation with another, but they have remained largely inaccessible due to their intractable size and unalphabetized content. Cursive OCR can change all this by beginning the retro-conversion process of handwritten records into electronic data files that can be searched, indexed, and tabulated with the mere touch of a button.

3) Military Records—Digitization of recruitment rosters and State Militia muster rolls would give historians a look at the cross-section of civilian participation in national conflicts. It would also attract heavy use from genealogical researchers interested in veteran ancestries.

4) Government Records—(voter registration lists, immigration lists, signature petitions) Digitization of these historical records would interest primarily political scientists, historians, and demographers, but it would also have current uses in screening voter petitions more efficiently for ballot qualifications.

5) Geneology Records—(marriage, baptismal and death certificates)

Digitization of these records is of high interest to geneologists and family historians. It would also serve, however, as a valuable cross reference to census and property tax surveys, thus helping to validate the precision and accuracy rates of stored information in parallel documents.

SUMMARY

The present application defines a technique of automatically recognizing handwriting. The technique automates the process of reading handwriting and correlating the handwriting with an intended meaning of the handwriting, also called cursive optical character recognition, "cursive OCR".

In one embodiment, the handwriting samples and meanings include a list of family names. According to the technique described herein, a database of labeled training examples is built. Another technique described herein defines using this database of labeled examples to automatically recognize handwriting.

BRIEF DESCRIPTION OF THE DRAWINGS

These and other aspects will now be described in detail with reference to the accompanying drawings, wherein:

FIGS. 2A and 2b show profiles of specified words, and how the specified words are formed into these profiles;

FIGS. 3A and 3B show how profiles can be combined to form hybrid profiles;

FIG. 4 shows naming profiles based on first syllable blends and information that follows those blends;

FIGS. 5A and 5B show an example of handwriting recognition, by changing each name into a path profile using hybridization factors;

FIGS. 6A, 6B and 6C show a chart that compares silhouette bar codes with specified family names;

DETAILED DESCRIPTION

A technique of automatically recognizing handwritten information is referred to herein as cursive OCR. An embodiment describes forming a database of information to be used in training. It is relatively easy to form a dictionary of words to be recognized. However, it may be relatively more challenging to digitize family names.

An embodiment refers to tax lists from the state of New York for the 1800's. There may be as many as 40,000 different family names that were registered in those tax lists. There may be historical interest in these tax lists. Therefore, an embodiment of the present system describes automatically recognizing and producing results from handwritten tax lists.

The inventors of the present invention recognized that most human readers actually first attempt to process whole-unit words when reading handwriting, rather than attempting to process the words letter by letter. The present system processes the outline of the whole word called a "word silhouette". These word silhouettes offer recognition clues to the meaning of the handwritten word as a whole.

Figure 1:
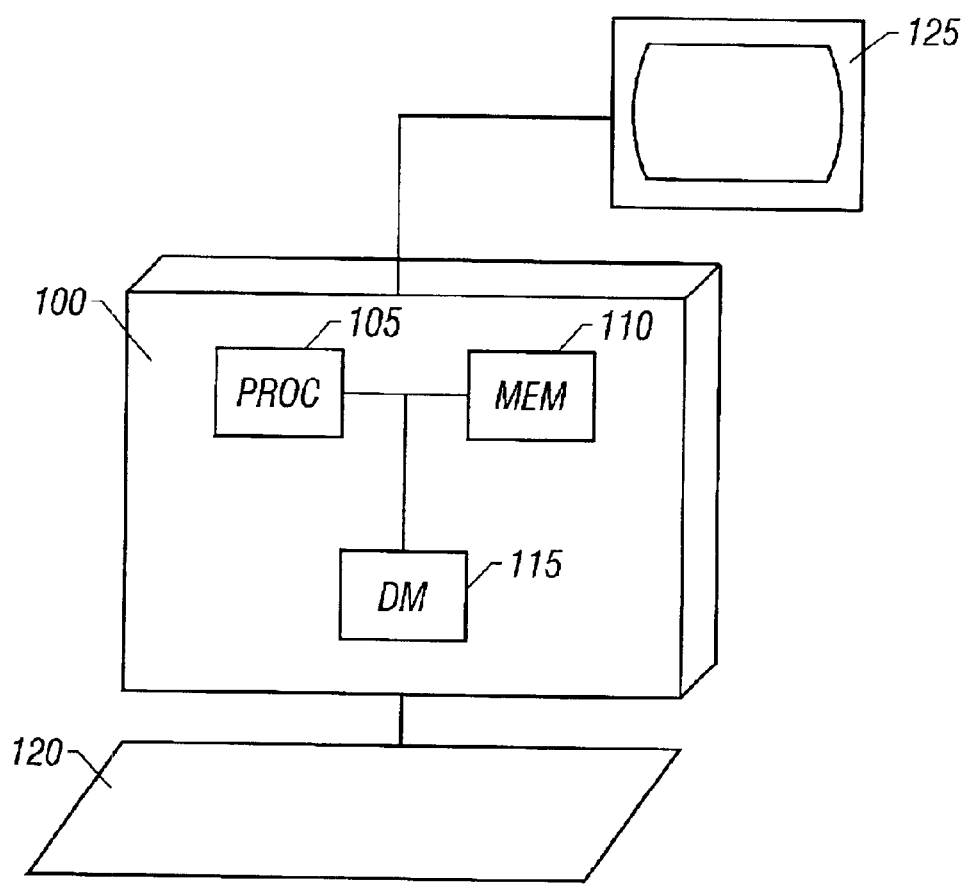
FIG. 1 shows an example of recognition of a cursive word when done a whole word at a time.

The present invention uses an automated computer process to carry out the cursive OCR. An exemplary computer system is shown in FIG. 1. The computer in FIG. 1 shows a computation part 100 including at least a processor 105, working memory 110, and program memory 115. The computation part 100 is connected to a user interface including a keyboard for data entry 120, and the display 125. Any conventional kind of computer can be used. The computer carries out the flowchart of FIG. 8 as described in further detail herein.

Figure 8:
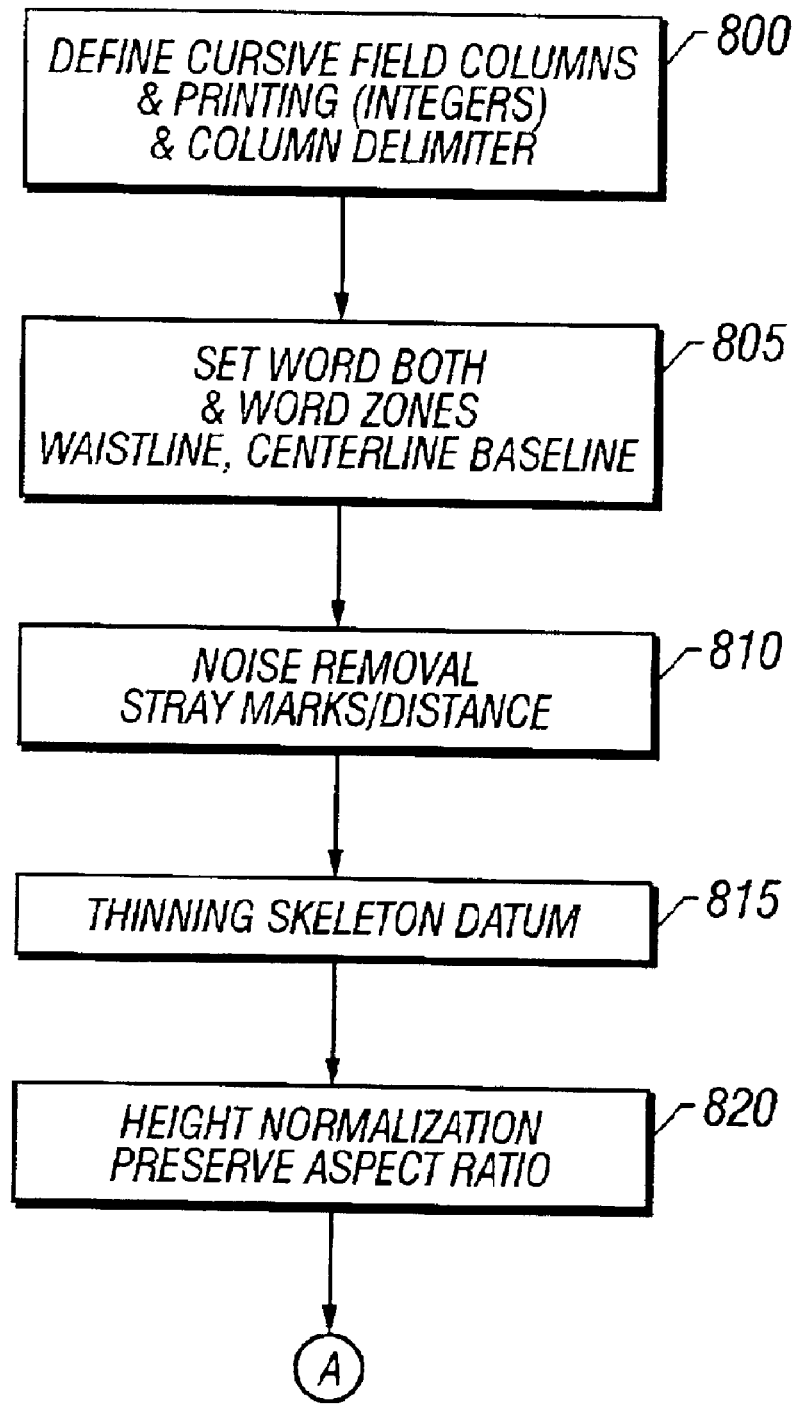
FIG. 8 shows a flowchart of the preprocessing operation.

A number of different kinds of information are used according to the system described herein to extract the information from the cursive writing. FIG. 8 shows the overall process of obtaining this information. An initial description, however, concerns as special kind of information which is obtained from the silhouette of the cursive writing.

The inventors recognized that context is extremely important in cursive recognition. The inventors recognized that a partially obliterated silhouette of the word "machine" may be easier to recognize as a whole, than it would be letter-by-letter. Viewing the whole series of imprints together provides many viewers with enough context to identify the correct pattern of the whole word.

The technique of silhouette bar coding recognizes that all words have a silhouette. A silhouette bar code is formed which maps the sequence for all high and low profile letters in the word. For example, the name "acken" has one high-profile letter in the middle of the word, here the letter k. The name "averil" has one high-profile letter at the end of the word, here the letter "e".

The handwritten words are reduced to silhouette bar codes using basic profiles referred to herein as prime profiles. The prime profiles can be added and/or superimposed upon one another in order to form hybrid profiles. As an example, the name "ackard" may be a combination of two prime profiles including one high bar in the middle of the word for the letter "k" and another high bar in the end of the word for the letter "d".

By reviewing a suitably large sequence of handwritten letters, a basic "code library" can be formed using the prime profiles together with all of the hybrids. This can be used to digitize handwritten words, including family names.

A few unique building blocks can yield exponentially large number of combinations, analogous to DNA sequencing. A list of words to be recognized is sorted into contextual libraries. In the example of family names, the listing of names may typically be sorted alphabetical. The result may be a finite set of contextual libraries. The libraries may be relatively small, i.e., they may be usually less than 50 per group.

Family name frames of reference can be constructed from voter registration lists, genealogical dictionaries, phone books, and the like.

FIGS. 2A and 2B show the twelve prime profiles used in a first embodiment. Each prime profile is assigned a path number that represents the format of the written word. For the examples in FIGS. 2A and 2B, each name began with the letter A. The silhouette is shown in the middle portion of FIG. 2. The path number 001 defines a capital "A" with no poles or holes. This means that there are no protruding letters such as B, D, or L. For above midline parts, and G, P, Y, C, for below the midline letter parts. Path 002 includes one "hole", or downwardly-extending stroke, in the middle of the word. Path 003 includes a "hole" at the end of the word.

Path 005 includes a hole in the middle of the word at least one letter away from the initial A and not at the end or next to the end.

Path 006 includes a capital "A" with one pole located one letter away from the end.

Path 007 includes a capital A with a pole at the end of the word.

A path 025 has a capital A with two adjacent poles somewhere in the middle of the word. Path 043 has a capital A with two adjacent Poles at the end of the word. Path 052 includes a capital "A" with a pole that is fused with a hole.

All of the different silhouette options can be catalogued in this way to form of series of prime silhouettes. FIGS. 3A and 3B show how the prime silhouettes can be superimposed to form large numbers of concatenated silhouette patterns. These serve as primary ZIP code sorting routes for more manageable spell check libraries. In FIG. 3A, the path 002 is fused with profile 005 to form a 2-5 hybrid. Analogously, FIG. 3B shows how the same two prime profiles are fused in the opposite order, to form a 5-2 profile.

The basic profiles and hybrid profiles are cataloged, and a list of words, here names, that match the hybrid are formed. For example, names which match the 2-5 hybrid may include Anglin, Angsten, Arrington, and Augustine. The 5-2 hybrid may only include a single name "Armitage". The library can be formed in any desired way, although the library described herein was based on the West Los Angeles yellow pages broken down into their prime and hybrid silhouette factors.

Many duplicate names may have the same silhouette. However, many of these names fit uniquely into one hybrid or another. Other names may be one of multiple names that is associated with a single hybrid.

As with DNA sequencing, only a few factors may yield an exponentially large number of permutations. 120 hybrid "ZIP codes" were formed using the twelve prime factors. A list of prime codes and a list of factored codes are defined. This is used as a list of recognition libraries. In this embodiment of family names, this can form a complete ZIP code library of all the family names.

In one strategy, phone book directories are sorted by first letter. Sequences of their prime silhouette factors are formed. These can form spell check recognition libraries. While some parallel processing might be necessary, in general, this can produce acceptable processing times and recognition rates.

A number of different naming conventions are contemplated. The ZIP codes are named by first syllable blends as shown in FIG. 4. In this embodiment, all of the tall high-profile letters are named first, e.g. by numbering them as 1–6. The most frequent low-profile letters are named next. The remaining high-profile letters are then given two digit numbers. Again, FIG. 4 shows the first syllable blends for the leading letter showing A - - -, Ab - - -; Abb - - - etc. Each combination of letters is assigned to a file number.

As an example of the above, an actual analysis of New York State, Chenago County tax records was carried out. The following was actually sorted and identified by silhouette bar codes.

FIG. 5 shows the actual information. In some cases, arranging the word by its silhouette barcode sorts the name as being one of a group of recognition choices. Others may be arranged as a group one. In any case, this profiling reduces the set of possible choices in a small profile cluster.

In FIG. 5, the first entry has a 10.001, the 10. part meaning it refers to the first syllable blend - - here "A" with no high profile letters in adjacent locations. The "001" is shown in FIG. 2A - - as including no "poles" or holes. There are 44 choices in this syllable blend/barcode combination. This means that it has a leading "A", no high-profile letters in the adjacent positions. As another example, entry 14 represents the name "Alsworth". This had a barcode of type 150.043 meaning that the first constant blend was "Al" and the third letter is immediately lower; type "150" in FIG. 4. The silhouette was type 043 having a capital "A" with two adjacent holes at the terminal end.

One difficulty in cursive OCR is caused by the inconsistency of the cursive lettering. In entry 21, the cursive scrawl could represent any of a number of different names e.g. Amins, Anins, Anriss or others. Possibly, these names could be recognized by using recognition matches in the barcode libraries for continuity of family names. However, for the purpose of obtaining greater than 90 percent certainty levels, all of the possible names may need to be recorded if no exact match could be made. Comments could be flagged to reassure users that final clarification will be provided for the multiple hit names. This could be clarified by cross-referencing with other records, for example.

While not perfect in this form, it still improves probability levels as compared with manual data entry by the average human typist. A human typist might take a best guess, while this system will take a more educated and mechanized determinations.

FIG. 6 shows a list of a number of 10.XXX different alternatives. Such a list can be used for classification.

The system described above has described a way to recognize family names written in cursive. These same techniques could be used to recognize any cursive words. In fact, it may be much easier to recognize other cursive words, because of the ability to obtain dictionaries of such cursive words. These same techniques can therefore be used to recognize any kind of cursive word.

This system is used with an automatic computer to automatically carry out cursive OCR. This system operates as shown in the block diagram of FIG. 7. A camera images the text that is on the document to be recognized. In this environment, the camera obtains a static image of the already-existing text. No dynamic information is available, since this system is presumably monitoring text that has been placed on the paper. However, dynamic acquisition may obtain additional information.

Figure 7:
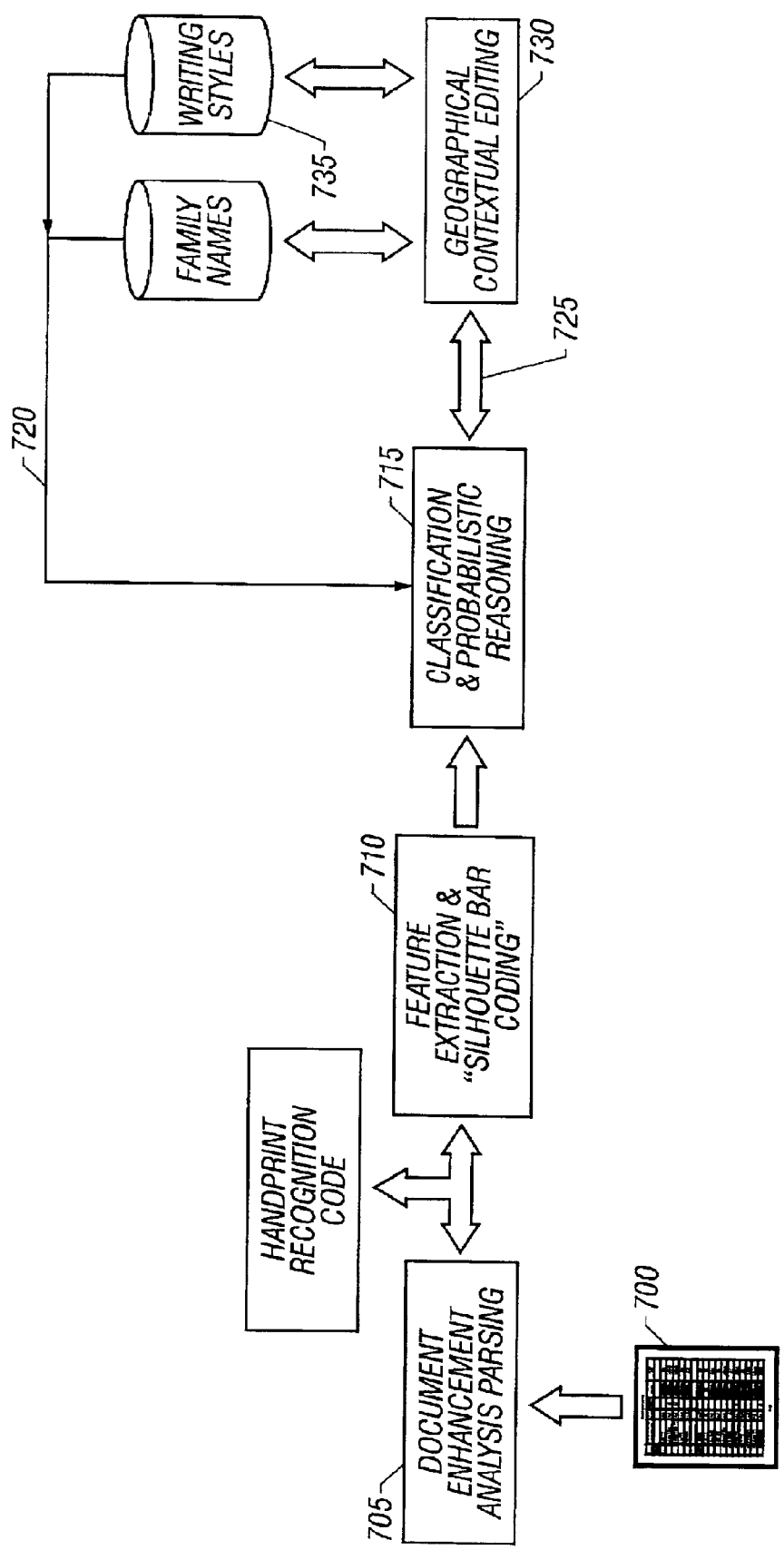
FIG. 7 shows a block diagram of an automatic computer used for cursive OCR.

The monitoring of text is carried out using a number of different functional blocks shown in FIG. 7. These functional blocks can be carried out in either hardware or software components. In this embodiment, the functional blocks are carried out in software modules running in the computer 100. However, these modules could alternatively include dedicated hardware modules, e.g. modules formed using field programmable gate arrays for example. The operation follows the blocks shown in FIG. 7.

FIG. 7 shows the overall block diagram of features that are recognized by the program. Cursive text is first entered at 700. The cursive text as entered can be obtained from a camera or the like. The cursive text is preprocessed by preprocessing module 705. The preprocessing can enhance the image in a conventional way. For example, this may first isolate the text regions of the document, and remove any lines associated with the form. An adaptive binarization algorithm based on an information theoretic criterion that suppresses speckle noise and shadows that occur due to the scanning process can also be used. This may also separate certain parts of the written page to be recognized by some other algorithm, e.g., a commercially available algorithm.

Also, the preprocessing may:

1) Frame Contamination:

When a low extension from one letter contaminates the rectangular x-y grid space of the name below it, defining overlapping reading fields becomes tricky.

2) Ornamental Embellishments:

Swashes (curlicues) are hard to differentiate from main letters of the word.

3) Inconsistent Spacing:

Many ledgers were ruled by hand. Spacing was estimated by sight, rather than by precise measurement.

4) Photocopy Defects & Artifacts:

Certain letters may be missing parts of the stroke, e.g., parts of the upper curve. Many deletions occur in archive documents due to filming defects or document age.

5) Stroke Fusion:

Occasionally, the lower extension from one word drops down into the space of another, and "fuses" to the bottom letter.

6) Horizontal Frame Bending:

Natural line curvatures occur at the book gutter. Bending may also be a random idiosyncrasy of cramped handwriting.

At 710, features are extracted using a feature extraction module. Line parsing is used to separate the horizontal lines of text. A horizontal projection or histogram is generated by summing the intensities of the pixels in each row. This distribution is then used to determine where lines of text occur. The parser labels each row containing values below a threshold as belonging to a potential line of text. In order to reduce the erroneous splitting of text, the algorithm checks if there exists any short runs of consecutive non-text rows and then relabels those rows as text rows. Similarly, in order to eliminate some false alarms, any short runs of consecutive text rows are relabeled those as non-text. After isolating the lines of text, the string of text is parsed into isolated words. A vertical projection or histogram is calculated within each collection of text rows, and if the bin value is below a threshold, the column is labeled as a text column.

The extracted features are sent to a classifier 715. Having isolated the lines of text, the string of text is parsed into isolated words. A vertical projection or histogram is calculated within each collection of text rows, and if the bin value is below a threshold, the column is labeled as a text column. Once the line and word parsing is completed, the words are extracted from the document by analyzing the bounding box of each word, to check if the line parsing may have truncated the word. For example, the first letter of a name may be separated from the rest of the name. This problem may be alleviated by assuming that the name is as least as long as twice the height of the name, for example.

As part of the feature extraction, it can be determined if the word was written in a handprint or cursive fashion. All handprint words are recognized using a Commercial Off The Shelf (COTS) recognition engine, while additional preprocessing is performed on the cursive words in order to regularize their appearance.

The classifier 715 outputs recognized candidate lists 725. These candidate lists may be corrected by feedback 720 based on the result of lexicon operations.

The candidate lists 725 are output to a lexicon matching module which includes a list of likely words. The output also is coupled to a writer style lexicon element, which includes short-term information about the writer's short-term habits. Both lexicon devices feed back information at 720, to help the classifier produce final output words.

As described above, the block diagram of FIG. 7 operates to recognize whole cursive words at one time, without recognizing the individual letters of the words. The recognition may use the techniques and classifications described above with reference to FIGS. 1–6.

Each of the elements in FIG. 7 will be further described herein.

Further details of the processing are shown with reference to the flowchart of FIG. 8.

Figure 10:
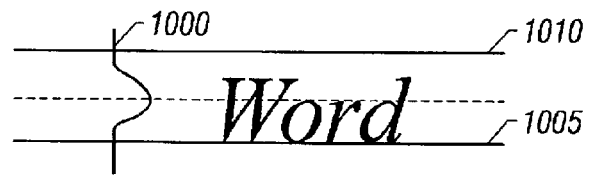
FIG. 10 shows word detection by statistical binning.
Figure 11:
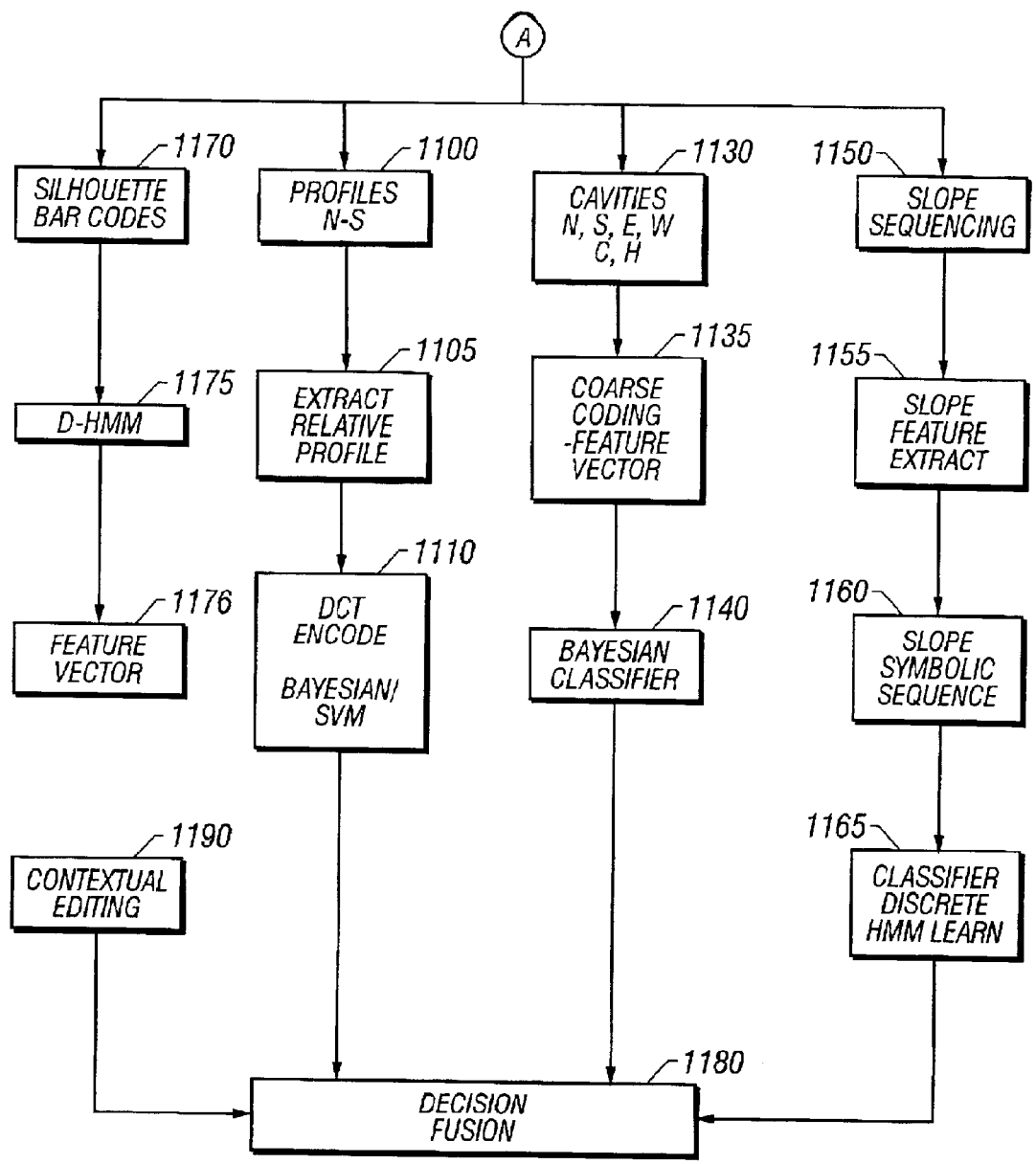
FIG. 11 shows an overall flowchart of all the different kinds of information that is obtained.

First, in 800 the extent of the word is defined by columns. The word is actually subdivided into three zones, shown as 805. Upper, Middle, and Lower, using horizontal projection analysis on the inverse image of the word. The word may actually be monitored in different orthogonal planes. For example, by monitoring in the vertical plane, the vertical extent of the word can be determined. The peak of this distribution is found, and then searching is carried out above and below this point. The operation is shown in FIG. 10. The word "word" is monitored, to obtain the distribution of dark portions, essentially the distribution of ink, along the word. This distribution is shown as element 1000. This district processed to form the waistline of the word and a baseline of the word. The baseline is the line that runs under the word, and is formed by the beginning of the peak portion of the distribution. This baseline 1005 runs under the word, while the waistline 1010 runs over the word. This centerline 1020 runs through the center of the word. The waistline is where the histogram 1000 goes below a threshold, and the baseline is the where the histogram bin value goes below a specified threshold. The average of the waistline and the baseline is referred to as the centerline. The height of the middle zone is a good estimate of the lower-case characters' height, while the upper and lower bounds provide information about the maximum and minimum escalations called the ascenders and descenders, respectively.

Connected component analysis (or eight-way connectivity) may be used for noise removal at 810, to determine the number of connected stroke regions in the word image. For each connected region extracted, the "bounding box" is found, which enables the computation of location, dimension, and centroid information. Using this information, components found to be far away from the waistline and baseline of the word are considered to be stray marks, and thus deleted.

Prior to feature extraction it may be useful to first skeletonize the word image, shown as 815. In this operation, extra pixels are removed, to produce a thinned image of the word. The basic idea of the thinning is to decide whether a pixel can be eroded by looking only at its eight neighbors.

Specified rules may be used to decide whether or not a pixel may be removed. A first rule is that a pixel can be deleted only if it has more than one and fewer than seven neighbors. Neighbors refer to 8-adjacent object pixels. This rule prevents end points of the skeleton from being eroded away and also makes sure that pixels are stripped away from the boundary of the region, not from the inside. The second rule states that a pixel can be deleted only if its counting index is one. This means that the pixel is connected to only one other region. If a pixel having a counting index of two were deleted, then two formerly connected regions would become separate, and this would violate the third property of a skeleton.

The process of thinning by successive deletion is much like that of erosion: the pixels to be removed are marked and are removed in a second pass. This is repeated until there are no more redundant pixels, at which point the remaining pixels are those belonging to the skeleton of the word. We then size normalize the word by scaling with respect to the aspect ratio of the resulting skeleton. FIG. 1 shows an example of a cursive handwritten name after application of our word segmentation, size normalization and skeletonization techniques.

To thin a region, these rules are applied to all of the pixels that belong to the region, and those pixels satisfying the previous conditions can be removed. This is done repetitively until no more pixels can be deleted, at which point the remaining pixels should be a skeleton. When a pass through the image results in no pixel deletions, the thinning procedure is finished.

825 normalizes the word box/aspect ratio, to make the size of this word box and aspect ratio either the same as, or scaled relative to, other items which are already in the database.

Figure 9:
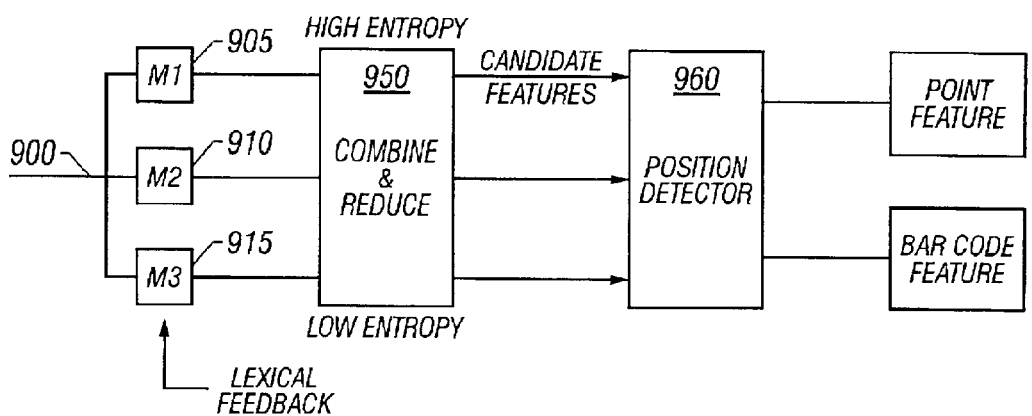
FIG. 9 shows a feature extraction block diagram.

Feature extraction is shown in more detail in FIG. 9. The preprocessed image information is input as 900. The input branches to a number of different feature extraction boxes. Each feature extraction box such as 905 operates to extract a specified feature. The processing detects the presence of the feature. Each of the boxes 905, 910 . . . is coupled to a combine and reduce module 950. The feature extraction may also receive lexical feedback shown as 915.

The combine and reduce module 950 carries out relevance weighting, and therefore separates the information into parts of high entropy and low entropy. The output of the combine and reduce module is therefore classed into candidate features forming a two-dimensional feature vector shown as 960. The two-dimensional feature vector defines features and positions in the word box where the feature have been found. This feature vector can include information from point features and from silhouette features and other features described in this document. The silhouette features have been described in detail above, and may aid in determination of the actual OCR'ed information. The point features represent effectively minutiae which exist in the written words. For example, areas where reversals in writing directions exist, or specified types of crosses, may represent point features. Each of these point features may be represented by a different symbol. The position of the symbol in the word can be mapped. Therefore, the feature vector may include information about which of these point features are present, as well as where in the word they are mapped.

The feature vector also includes barcode signature features which extract the information described above. Each measurement can be numbered as an "M" measurement. The M1 is a "North" profile which may be defined as a profile that looks down from the top of the word towards the stroke. This forms an analog vector, showing the distance between the top of the word and the stroke. Analogously, a South profile (M2) which shows the distance from the bottom of the box towards the stroke.

M3 is a relative North to South profile which is a profile of the difference between North and South profiles described above.

M4 and M6 respectively define East profile, West profile and East minus West profile.

These profiles may be transformed into the analog domain using a specified transform such as the discrete cosine transform or DCT. This provides a list of coefficients representing the normalized handwriting. The present system uses a combination of global and local features in the form of profile signatures and morphological cavities to characterize a word. The present system uses combinations of different techniques to carry this out in automated way.

Human word spotting experiments have shown that global shape information is an important cue used to distinguish words. The general shape of a word may be approximated using simplified profile signatures.

Vertical projection analysis is used to determine profiles at 1100. The upper ("North") and lower ("South") profiles of the word are obtained. "West" and "East" profiles are generated by horizontal projection analysis and are used to detect descenders and ascenders. Relative profiles are obtained at 1105. One dimensional transform methods e.g, DCT coding, are used to encode the North and South profiles as well as their difference, into feature vectors that are suitable for matching at 1110. The desired transform should concentrate the energy associated with the profile signatures into as few coefficients as possible. A variety of transform methods may be used including wavelet approaches, but DCT may perform best due to the fact that successive values of the profile signatures are often highly correlated. This is particularly true for the lower profile, which tends to exhibit a flat response except in areas where a descender exists.

Figure 12:
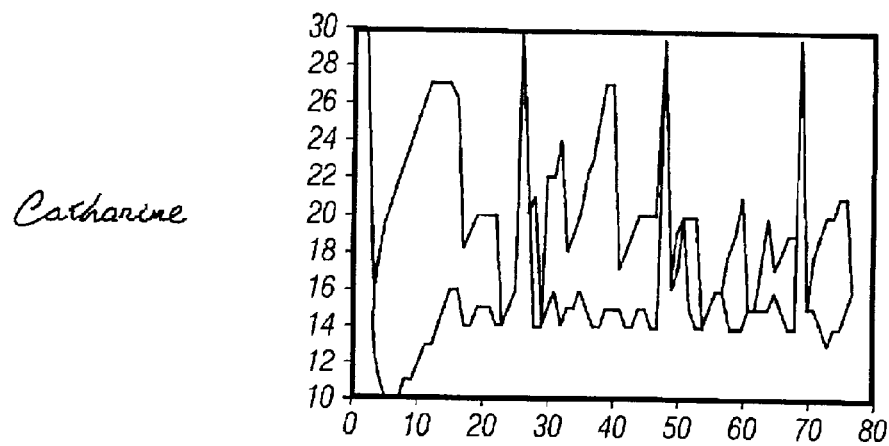
FIG. 12 shows N-S profiling.
Figure 13:
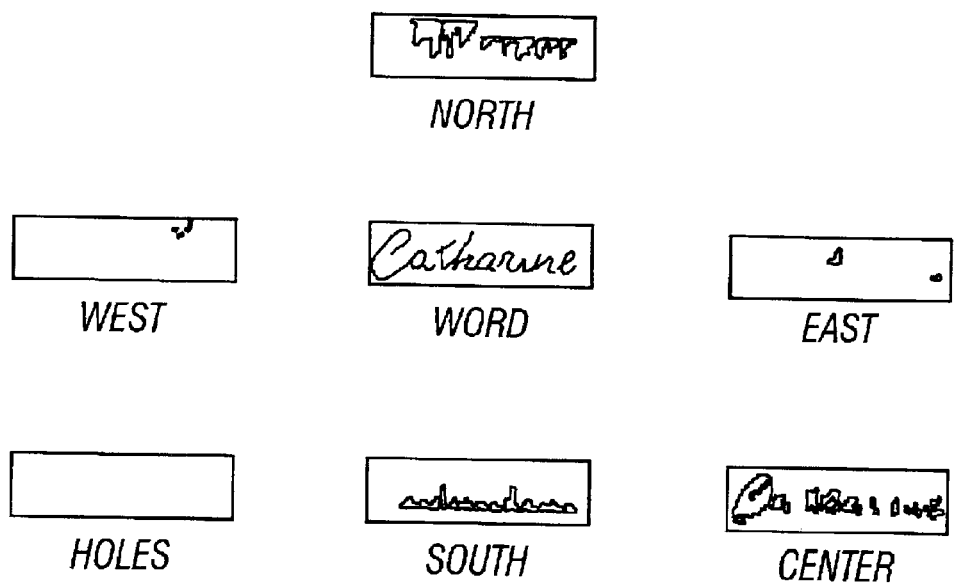
FIG. 13 shows cavity formation.

FIG. 12 shows an example of the North and South profiles extracted using this technique.

The cavity or "C" extraction represents cavity features in the handwriting. Cavity features are defined as gaps between projections which define areas not filled by the M profile. Each North-South going profile should intersect each East-West going profile. So long as there is an intersection, there is no cavity. A cavity is defined as any part of the writing which is not intersected by both a North-South profile and an East-West profile. These cavity features C-1 are characterized.

The cavities capture local variations in the word, which are useful in discriminating words having the same general shape. There are six cavity feature types: East, West, North, South, Center, and Hole. A cavity is a region of points bounded by the character stroke on at least three sides (named by the side on which they are not bounded). A Hole is a region that is completely bounded, while a Center cavity is surrounded on all four sides, but is not a hole. A morphological algorithm is used to compute the cavity features using combinations of dilations or smears, in different directions and intersections. The two dimensional spatial arrangement of the cavity features, as well as the descender and ascender information, and points of infliction are found at 1130.

If North, South, East and West denote structuring elements in the directions North, South, East and West. Let the feature images be denoted as I, HF, CF, NF, SF, EF, and WF. In particular, I denotes the image of the character itself. Furthermore, let B denote the background, or complement, of the image I. The feature images are computed according to the following morphological algorithm:

$$NF=I \oplus N \cap (I \oplus S)^C \cap I \oplus E \cap I \oplus W \cap B$$

$$SF=(I \oplus N)^C \cap I \oplus S \cap I \oplus E \cap I \oplus W \cap B$$

$$EF=I \oplus N \cap I \oplus S \cap I \oplus E \cap (I \oplus W)^C \cap B$$

$$WF=I \oplus N \cap I \oplus S \cap (I \oplus E)^C \cap I \oplus W \cap B$$

$$CF=I \oplus N \cap I \oplus S \cap I \oplus E \cap I \oplus W \cap B$$

$$HF=(\text{span-until}(BORDER,B,T) \cap I)^C$$

A hole is any region of background that is completely surrounded by foreground in the word image. In the expression for the hole feature image (HF), BORDER denotes the image that consists of the one-pixel-wide border around the edge of the image, which is assumed to be completely contained in the background. T represents the 3×3 binary structuring element (N,S,W,E). The function span-until represents the iteration of the conditional dilation operation.

As part of the cavity acquisition operation, coarse coding of the information is carried out at 1135. The coarse coding may code, for each 25×25 block, the number of "on" pixels. This can be used to form a feature vector that is processed by the Bayesian classifier at 1140.

More information may be obtained from the dynamic features of the handwriting. This D-1 characterization may determine from the kinds of lines and the ways in which these lines slope, likely movement of the pen during the actual writing. The stroke like features can also be characterized.

Handwritten words reveal a repetitious succession of slope sequences that can be reduced to a series of standardized "changes". These markers of change can be combined and recombined in many ways, to represent language. In a way, the whole process is symmetrical to the strategies used in molecular biology where a simple alphabet of nucleotides can be sequenced in a countless number of ways to code for proteins found in living cells. In genetics, not every mutation is lethal to the message contained in its code. In other words, some mutations in DNA sequences have no effect on the translation into its functional protein. There is a certain amount of forgiveness in literal translations, and humans make the same adaptations when they read a handwritten message.

In the real world of archival microfilm photos, one or two deletions and/or insertions may prove to be insignificant in the context of a whole name match. Even with random cursive mutations, there may be huge gaps between the top match and the next closest hit in the reference spell-check library, thus allowing us to establish a threshold for an OCR match. We have developed a rule-based approach that permits the recovery of the writer's motor-temporal information from the image of the cursive handwritten word. The algorithm scans the word, and attempts to encode the movement as executed by the writer during the generation of the word. The algorithm is described in greater detail herein.

Slope sequencing is an attempt to obtain temporal information from the already-produced signature. The slopes sequence follows the way that the characters were written, in order to attempt to deduce how the pen was moved to make these features.

At 1155, slope feature extraction is first carried out. The slope feature extraction is an attempt to find the features from the pen movement. Each of a plurality of different kinds of features is identified.

While the following describes specific rules that can be used, it should be understood that other rules could be alternatively used.

If the scanning bar of a scanner is aligned parallel to a column of names, then the scanner will plot a scattered array of "first hits" as it begins to move across the x-axis. Scanners are usually calibrated in pixels, and the coordinates of the handwritten strokes plotted in these scans could also be calibrated in pixels.

Coordinates of each line trace may then be measured in ordered pair sets (xn, [ymin–ymax]). When the slope of any tracked line reaches its maximum y-axis limit, it will help determine the domain of the segmented reading frame.

The following terminology may be used for the measured changes.

The "On-signal", defining how a tracking file is initiated are called "F-files". These files represent the "First Hit". The first hit is defined as any continuous vertical line segment on the y-axis with at least two empty pixel units above and at least two empty pixel units below its ymax and ymin values. Since many microfilmed archive documents contain "background pixel noise," single pixel hits will be ignored until two successive x-axis steps contain a set of vertical pixel groups with overlapping y-axis domains and a certain threshold of gray scale density. The word "first" also implies, of course, that there were at least two empty x-axis spaces preceding the first hit.

All "First Hit" files are given a prefix "F" to identify their tracking feature. When successive x-axis steps detect new "First Hit" files, each new "First Hit" file is simply given the next higher tracking number in consecutive order (i.e. F1, F2, F3, etc.).

The "Off-signal" defines how a tracking file is terminated. This is called a "T" file. "Divergence" or D is when one file becomes two. Conversely, "Convergence" is when two files become one. "Positive Change" or P defines slope changes from a negative to a positive file. A "Negative Change" or N defines slope changes from a positive to a negative file. Horizontal Displacement or "H-files" include movement in the horizontal direction.

"Primary Range Limits" - - Range Termination, "Valleys" define all the slope tracking signals that locate valleys. "Peaks" define all the slope tracking signals that locate waistline peaks. A definition of the Reading Frame describes how Valley & Peak locations map the baseline and waistline by locating cursive ascenders and descenders and separate fused strokes from contaminating entries).

At 1160, the features that have been categorized are sequenced. The sequence features effectively becomes a feature vector which shows the different features within each sequence.

A first rule is the Sine-Wave Sequencing Rule. The most elementary sequence of change in a handwritten curve is the simple slope sign changes from valley to peak and then valley again as the scanning bar moves across the x-axis from left to right.

This rule captures that by stating that sequencing programs will record all prime slope changes in the natural order of events as the tracking programs recorded them until there is an interruption or termination signal.

These signals may represent a "change in the number of overlapping y-segments" such as in divergence, convergence, or termination signals.

Normal positive to negative to positive change is recorded until a diverging ".a or .b" file, "M"-file, or ".T"-notation is encountered.

One of the primary obstacles to cursive OCR in the past has been that normally all the letters in a handwritten word are connected together. The characteristics of each letter are difficult to define since they all run together. Pen strokes rarely leave the paper, except to cross the letter "t" or dot a letter "i". This fact, however, can be turned around to advantage in "stroke sequencing".

The history of a pen's digital movement across a piece of paper gives us the keys to defining its "stroke sequence".

When two line segments "diverge", for example, from a common precursor, there are only two ways in which this could happen in handwriting. (The pen obviously did not split in half to mark each path.)

The first possibility is that the pen merely reversed its forward direction during its return trip to the baseline, similar to the way in which a letter "z" is formed when it is printed.

The second possibility, however, is that the pen retraces itself in order to return to the point of divergence. In other words, it also had to reverse its forward direction during its return trip to the baseline until it reached the point where it could split away to form the lower branch.

When a tracking sequence encounters a divergence signal, computer programs will look to the top subfile first, recording all the sequence changes of the top "a" branch until it reaches another termination signal (".T", "M.T", or "M" signal).

After the top subfile is terminated, then the bottom subfile (+.b, −.b, or 0.b) is sequenced through all of its slope changes until it reaches its own sequence interruption signal.

All "M.T"-mediated sine waves are formed from skewed wave functions due to the natural slant of the handwritten word. From the point of view of a tracking program, however, there are always at least two positive slopes involved that merge at some peak location above the baseline and then terminate. Since cursive words represent a continuous pen movement, the only way for two tandem positive slopes to merge without lifting pen from paper is for the hand to reverse the direction of one of its forward strokes when it returns to the baseline. At the baseline, however, it will certainly need to reverse its direction again in order to continue progress along the x-axis. This "West to East" reversal will always create "divergence", and thus divergence is a very common successor to M.T signals. Other similar rules are defined for a mediated sine sequence; which is any "M"-file that is terminated within the normal stroke thickness for merged files (3–6-axis steps from the first merge signal to the beginning of a ".T" signal) will initiate a "M.T" signal. Stroke sequencing will then continue on with the next baseline valley file.

1) If divergence preceded the "M.T" signal, then "M.T" was a part of Rule 2, and programs merely finish sequencing the lower subfile (.b) to its next wave interruption signal. The slope sequence is recorded as follows:

// .a M .T -.b P// .a-.b P

Note: The "M.T" signal was only recorded once.

When the second leg reaches the "M.T" signal it is always the complementary branch of divergence, so there is no need to record the same "M.T" signal twice.

2) If divergence did not precede the "M.T" signal, then there is only one more possible movement - - the next valley must contain a "First Hit" (F-file) with new divergence at some point in its trace. This makes sequencing choices very simple in Rule 3. Either M.T is controlled by preceding divergence (Rule 2), or it moves on to the F-file in the next valley where it will encounter another divergence signal (provided there is a baseline transition, and not an H-file transition). The new ".a" branch will mate with the previous "M.T" signal and the lower ".b" file will finish the next valley transition.

"M.T"—Mediated Editing

Knowing "how a stroke was formed dictates how it will be sequenced." There is one more important benefit, however, in knowing the sequence rules for "real-time pen movement." Knowing how a stroke was formed "in real time" also provides valuable information for a second level of "post-sequence editing".

Post—Sequence Editing:

Once a word is sequenced, reference libraries will try to make a sequence match, allowing for deletions, insertions, and substitutions in much the same way as "Gene Bank" programs pull up all the "best fit" matches for a target strand of DNA. If, however, several possible matches are pulled from the reference library—all with similar threshold scores—then knowing the rules for pen movement "in real time" would help to bias the recognition choices.

For instance, Rule 3 (above) gives some very useful guidelines for handling photographic deletions in situations where the quality of microfilm is poor. The photograph in FIG. 4 (below), for example, shows the letter "m" with two major photographic deletions in the middle of the letter. This type of deletion, by the way, is very common in the reels of archive storage and probably results from either centuries of age-related document fading or from over-exposure during the filming process. Nevertheless, Rule 3 provides a logical way to edit out these types of stroke deletions.

Rule 3 states:

If divergence precedes the "M.T" signal, then "M.T" is a part of Rule 2, and programs merely finish sequencing the subfiles as they would any other divergence signal. In FIG. 4, the sequence prior to the second "M.T" signal should be recorded as follows:

F // .a .b M.T . . . (etc.)

The actual sequence, however, causes the artificial insertion of an extra "First Hit" signal. In fact, it reads:

F // .a .b .T F M.T . . . (etc.)

This artificial tracking file insertion can be edited out by Rule 3 and the logic of "real time" stroke formation.

"Divergence follows divergence" most commonly in "looped letters", such as the letter "e" and the letter "s". In these situations, diverging files diverge again themselves. Technically, one diverging file is a subfile of the other, and both diverging files share the same top subfile (.a).

This archive example is made clearer by its skeletonized version below. Nevertheless, tracking programs can still recognize the first divergence pattern with the sudden vertical displacement detection—Tracking Rule 4b.

When the "min.-min." tracking calculation detects sudden negative vertical displacement, the divergence signal is triggered.

The "H" file diverges first into ".a" and "-.b", and then several steps later the ".a" file diverges again. Since the ".a" file is already being tracked first by Sequence Rule 2, it continues again as first choice file, even after another divergence is discovered. When the "M.T" termination signal is reached, then the sequencing programs merely work their way backwards, taking the lower branch of signal 2 and then the lower branch of signal #1.

The entire sequence is more clearly seen in the skeletonized version at the bottom left:

H // . a // .a M .T . b -. b P

Triple Divergence is really just a variant of Rule 5 ("diverging divergence"), only this time both divergence signals are superimposed on the same grid coordinates, so that what the computer "sees" is one file "IN" and three overlapping tandem subfiles "OUT".

Here again, the sequence rule is more clearly illustrated by the "skeletonized" tracking file at the bottom of this page. Nevertheless, there is a tracking rule that can detect "triple divergence". Usually, divergence detects only two tandem, overlapping y-segments, but when three overlapping tandem files are detected, then a "3-D" divergence signal is triggered.

Sequencing programs can record the signal as "three slash marks" (///), and the sequencing rules are basically the same as in Rule 5A. The top subfile is recorded until it reaches its termination signal. Then the middle subfile is recorded, followed by the bottom subfile.

The final sequence is as follows:

H /// .a M.T . b - . b P

H // . a // .a M.T . b - . b P

Ghosting Captured Strokes is done by detecting any stroke that is surrounded on all four sides by other tracking files will simply be eliminated. The simplified version makes it easier to classify all the permutations in the reference library.

At 1165, a classifier is used to attempt to find the closest cursive OCR match. This can use, for example a discrete hidden Markov model. Many models are learned as described above, and used. Alternatively, a Support Vector Machines (SVMs) may be used to classify the different writing styles. The statistical Hidden Markov models (HMM's) can be learned from the "silhouette bar code" representations, which classify names into groups exhibiting similar characteristics. The feature vectors are conditionally modeled by mixtures of Gaussian probability density functions (PDF's), and a continuous density HMM is trained. The classification is determined using a maximum likelihood criterion.

Geographical Contextual Editing:

Geographical contextual editing, shown generally at 1190, represents a higher level of pattern recognition where unintelligible scribbling can be translated on the basis of family tree associations or connections to identical property inventories or address locations in parallel surveys. Although the early American communities from 1799-1803 were not static, they were fairly stable, so at least a small measure of "geographical context" can be built into this project, such that recognition rates are increased through the use of lexicon matching with a dictionary of known family names occurring in the region. In addition, most government documents were recorded by "trained legal scribers" and administrative clerks whose handwriting conformed to certain professional standards, thus we can further increase our recognition rates by adjusting our algorithms to these disciplined styles.

At this point in the flowchart, a number of different items the information are available. The information from 1165 is based on the classifier of the dynamic information, i.e. the discrete hidden Markov model for the slope sequence extraction. The information from 1140 is based on the cavity information. Information from 1110 is extracted from DCT encoding the information from the north-south East and West profiles and their relative profiles. The above has also described determining a silhouette which is done at 1170. A discrete hidden Markov model is formed at 1175, and used to form the feature vector at 1176. In addition, contextual editing results are available from 1190. All of these factors may be used.

At 1180, all of these different kinds of factors, including the silhouette barcode information, profile information, cavity information, and slope sequencing information, are used. 1180 assesses the qualities of the different decisions and assesses a decision based on a some combination of the different types of examination.

Although only a few embodiments have been disclosed in detail above, other modifications are possible.

What is claimed is:

1. A method of recognizing handwriting, comprising:

obtaining a sample of handwriting;

segmenting said sample into separate handwritten words; and attempting to recognize a whole handwritten word without attempting to recognize any individual letter of the whole handwritten word, by categorizing a whole of said handwritten word according to its overall silhouette; and wherein said categorizing comprises categorizing positions of features in said handwritten word, and categorizing first syllable blends of said handwritten word.

2. A method, comprising:

analyzing a sample of handwriting by analyzing a whole word of said sample at any one time, said analyzing comprising (1) forming information indicative of a silhouette of said whole word, wherein said silhouette information includes prime profiles indicative of specified features, used to form concatenations of said prime profiles which concatenation describe combinations of specified features, (2) analyzing slope sequences of the handwriting, (3) analyzing N-S profiles of the handwriting, and (4) analyzing cavities within said handwriting, and (2) comparing said information with a database of information about other analysis information.

3. A method as in claim 2, wherein said database of information comprises a database of information obtained from a list of possible words.

4. A method as in claim 2, wherein said silhouette information includes information indicative of high parts in the word and low parts in the word, and positions of said high parts and low parts in the word.

5. A method as in claim 4, wherein said silhouette information also includes information about first syllable blends in the word.

6. A method as in claim 4, wherein each of a plurality of silhouette information is provided with a number.

7. A method as in claim 4, wherein each feature is assigned a number.

8. A method comprising:

analyzing a sample of handwriting by analyzing a whole word of said sample at any one time, said analyzing comprising forming information indicative of a silhouette of said whole word, and comparing said information with a database of information about other silhouettes, wherein said silhouette information includes prime profiles indicative of specified features, and concatenated profiles indicative of combinations of specified features; and wherein said silhouette information includes information about first syllable blends in the word.

* * * * *